United States Patent
Meeks et al.

(10) Patent No.: US 12,459,606 B2
(45) Date of Patent: Nov. 4, 2025

(54) HIGH-DENSITY POLYETHYLENE MARINE BOOM

(71) Applicant: WORTHINGTON PRODUCTS INCORPORATED, East Canton, OH (US)

(72) Inventors: Paul S. Meeks, East Canton, OH (US); Marc Schneider, East Canton, OH (US); Jon Garver, East Canton, OH (US)

(73) Assignee: WORTHINGTON PRODUCTS INCORPORATED, East Canton, OH (US)

( * ) Notice: Subject to any disclaimer, the term of this patent is extended or adjusted under 35 U.S.C. 154(b) by 0 days.

(21) Appl. No.: 18/729,366

(22) PCT Filed: Feb. 23, 2022

(86) PCT No.: PCT/US2022/017418
§ 371 (c)(1),
(2) Date: Jul. 16, 2024

(87) PCT Pub. No.: WO2023/146557
PCT Pub. Date: Aug. 3, 2023

(65) Prior Publication Data
US 2025/0002119 A1    Jan. 2, 2025

Related U.S. Application Data

(60) Provisional application No. 63/303,232, filed on Jan. 26, 2022, provisional application No. 63/303,217, (Continued)

(51) Int. Cl.
*B63B 22/04* (2006.01)
*B63B 5/24* (2006.01)
(Continued)

(52) U.S. Cl.
CPC ............. *B63B 22/04* (2013.01); *B63B 5/24* (2013.01); *B63B 22/16* (2013.01); *E02B 15/085* (2013.01);
(Continued)

(58) Field of Classification Search
CPC ......... B63B 22/04; B63B 22/16; B63B 69/00; B63B 73/00; B63B 2241/00; B63B 35/62;
(Continued)

(56) References Cited

U.S. PATENT DOCUMENTS 3,651,647 A    3/1972   Flaviani
4,016,726 A *  4/1977   Campbell .......... E02B 15/0814
                                                    405/71

(Continued)

OTHER PUBLICATIONS

International Search Report filed in corresponding PCT Application No. PCT/US22/17418 dated Apr. 20, 2022; 2 pages.
(Continued)

*Primary Examiner* — Daniel V Venne
(74) *Attorney, Agent, or Firm* — Black McCuskey

(57) ABSTRACT

A High-Density Polyethylene (HDPE) marine boom includes an elongated generally cylindrical shell including an inner layer and an outer layer formed from HDPE with the same formulation, with the inner layer including at least 2% carbon black by mass and the outer layer not including carbon black. The outer layer includes a colorant with ultraviolet stabilizers and the inner layer does not include the colorant. The inner layer is thicker than the outer layer and has been coextruded to form a unitary body. First and second caps formed from the same material as the outer layer are fusion welded to the shell across the full thickness and around a full circumference of first ends and second ends of the shell and form a watertight seal. A floatation billet is in the shell.

21 Claims, 12 Drawing Sheets

Related U.S. Application Data filed on Jan. 26, 2022, provisional application No. 63/303,259, filed on Jan. 26, 2022, provisional application No. 63/303,224, filed on Jan. 26, 2022, provisional application No. 63/303,220, filed on Jan. 26, 2022.

(51) Int. Cl.
  *B63B 22/16* (2006.01)
  *E02B 15/08* (2006.01)
(52) U.S. Cl.
  CPC ....... *B63B 2207/00* (2013.01); *B63B 2231/40* (2013.01)
(58) Field of Classification Search
  CPC ... B63B 35/44; E02B 3/00; E02B 3/04; E02B 3/20; E02B 15/00; E02B 15/04; B63G 9/04
  USPC ...... 114/234, 266, 267, 382; 441/48, 49, 54, 441/136
  See application file for complete search history.

(56) References Cited

U.S. PATENT DOCUMENTS

| | | | | |
|---|---|---|---|---|
| 4,295,756 | A | * | 10/1981 | Blair ................... E02B 15/0814 24/453 |
| 4,507,017 | A | * | 3/1985 | Magoon .............. E02B 15/0814 405/71 |
| 5,439,315 | A | | 8/1995 | MacKenzie |
| 5,713,698 | A | * | 2/1998 | Worsley ................ E02B 15/085 280/515 |
| 7,086,421 | B2 | | 8/2006 | Backman |
| 7,828,494 | B1 | | 11/2010 | Reynolds |
| 10,577,058 | B2 | * | 3/2020 | Meeks ................ E02B 15/0807 |
| 2018/0073665 | A1 | | 3/2018 | Bombino |

OTHER PUBLICATIONS

Written Opinion filed in corresponding PCT Application No. PCT/US22/17418 dated Apr. 20, 2022; 5 pages.
International Preliminary Report on Patentability filed in the corresponding PCT Application dated Jul. 30, 2024; 6 pages.

\* cited by examiner

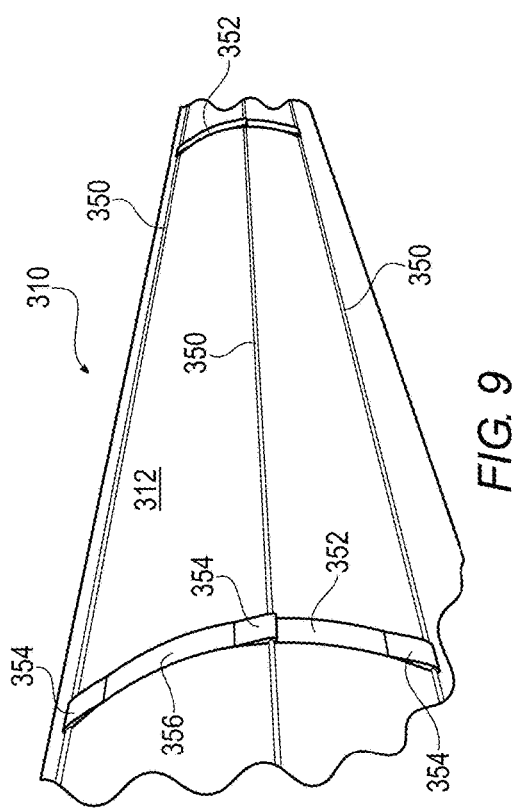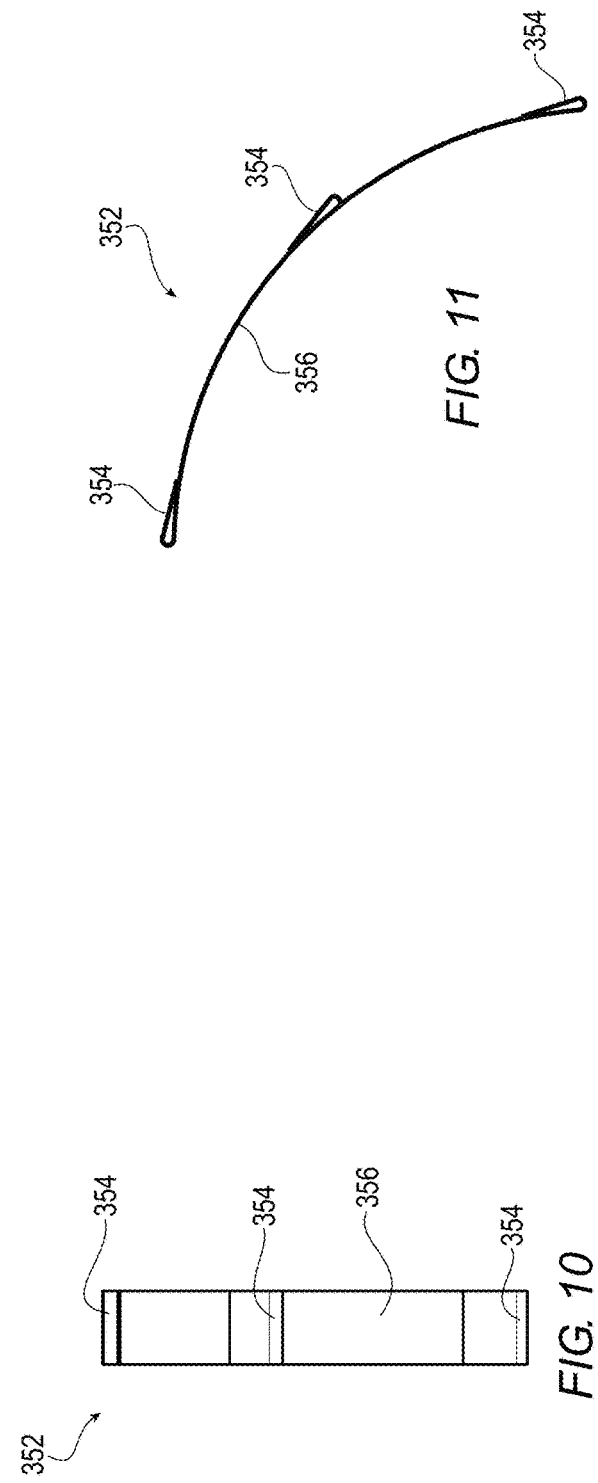

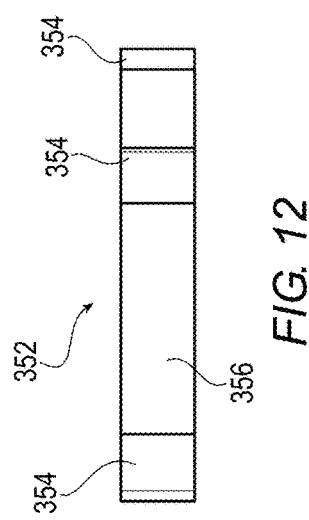
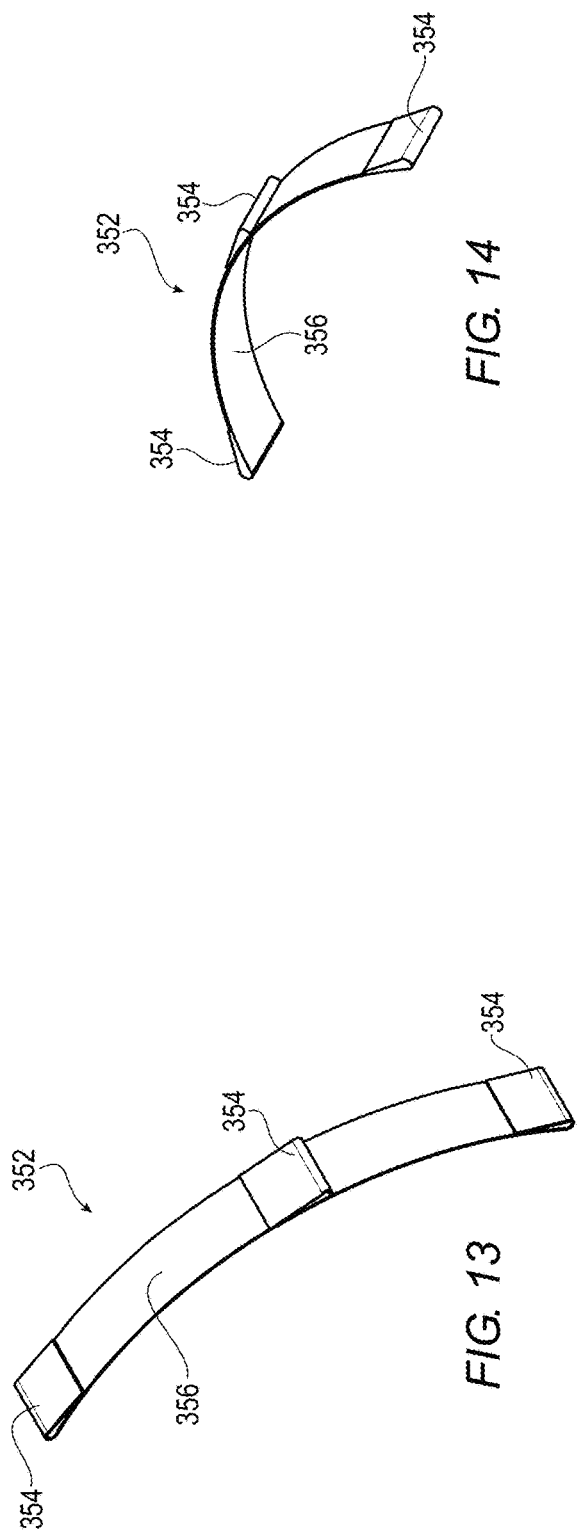

HIGH-DENSITY POLYETHYLENE MARINE BOOM

CROSS-REFERENCE TO RELATED APPLICATIONS

This application claims priority to and the benefit of U.S. Provisional Patent Applications Nos. 63/303,217, 63/303,220, 63/303,224, 63/303,232, and 63/303,259, all filed on Jan. 26, 2022, the contents of which are hereby incorporated by reference in their entirety.

BACKGROUND

This relates in general to marine barriers such as marine booms.

Marine booms are often utilized to form certain types of waterway barrier. For example, some marine booms are used to form containment barriers. Some marine booms are used to form navigational barriers. Generally, these waterway barrier systems include a number of buoyant marine boom bodies that float at or about the water's surface and are connected together.

SUMMARY

This relates more particularly to a High-Density Polyethylene (HDPE) type marine boom.

A High-Density Polyethylene (HDPE) marine boom includes an elongated generally cylindrical shell including an inner layer and an outer layer. The inner layer and outer layer are formed from HDPE with the same formulation, with the inner layer further including at least 2% carbon black by mass and the outer layer does not include carbon black. The outer layer further includes a colorant with ultraviolet stabilizers and the inner layer does not include the colorant. The inner layer is thicker than the outer layer, where the inner layer and outer layer have been coextruded to form a unitary body. The shell defines a cavity and has first and second ends.

The marine boom also includes first and second caps formed from the same material as the outer layer that are disposed about the first and second ends if the shell, respectively. Each cap includes a generally cylindrical main body having an outer diameter and an inner diameter equal to an outer diameter and an inner diameter of the shell. An end wall extends across one end of the main body. The other end of the main body of each of the first and second caps are axially aligned with the first and second ends of shell respectively and are fusion welded together across the full thickness and around a full circumference of the first ends and the second ends and form a watertight seal.

The marine boom also includes a floatation billet disposed within the cavity in the shell.

The marine boom may include first and second structure rings disposed about a respective circumference of the shell proximate the first and second ends of the shell, respectively. Each ring includes two generally semicircular arcuate pieces, extending circumferentially along the shell and forming a collar about the shell. Each piece terminates at each end with a coupling tab, where the pieces of each ring are fastened together at at least one end with a fastener extending through apertures in the tabs and a spring member disposed outside one of the coupling tabs and disposed therebetween the one of the one of the coupling tabs and a portion the fastener.

The pieces of each ring may be fastened together at the other end with another fastener extending through apertures of those tabs, and at least one lug extending from at least one of the arcuate pieces, and chain maybe shackled to the lug.

The pieces of each ring may be fastened at the other end to a structural member with another fastener extending through apertures of those tabs and through the structural member. The structural member may be generally elongate U channel facing upward toward the shell, and having ends that do not extend beyond the end walls of the first and second end caps.

First and second connectors may be disposed in a respective end of the structural member and attached there to, with each connector having at least one lug extending axially away from the marine boom and beyond its respective end cap.

A debris skirt, a debris panel, a marine light, a gate, or a net may be connected to the structural member.

In at least one embodiment, the thickness of the inner layer to outer layer is in a ratio of approximately 7 to 1.

In at least one embodiment a graphic formed on a piece of polymer film is fused to the shell by flame treating the polymer film and the outer layer of the shell until each at least partially liquifies and then allowing the two to cure together.

In at least one embodiment a hand hold block including a main attachment body having a rear surface having a curvature coincident with an outer curvature of the shell and including a plurality of mounting apertures and including a grasp portion extending outwardly and upwardly from the attachment body, is disposed about an outer circumferential surface of the shell with the rear surface facing the outer circumferential surface, and includes a plurality of mounting fasters each extending through a perspective mounting aperture an into the outer layer of the shell or inserts in the shell.

In at least one embodiment a strap system including at least two tethers is mounted to the marine boom and extends generally parallel along the longitude of the shell. At least one strap including at least two strap passageways each has at least one of the tethers passing therethrough. The tethers may be vinal coated steel wire and the straps are made of weather durable nylon. The tethers may be mounted to the shell. The tethers may be mounted between the first and second structure rings.

A marine boom system includes a plurality of such marine booms.

Various aspects will become apparent to those skilled in the art from the following detailed description and the accompanying drawings.

BRIEF DESCRIPTION OF THE DRAWINGS

FIG. 9 is a partial perspective view of the strap system of FIG. 8.

FIG. 10 is a front view of one of the straps of the system of FIG. 8.

FIG. 11 is a side view of the strap of FIG. 9.

FIG. 12 is a top view of the strap of FIG. 9.

FIG. 13 is a front perspective view of the strap of FIG. 9.

FIG. 14 is a bottom perspective view of the strap of FIG. 9.

DETAILED DESCRIPTION

Figure 1:
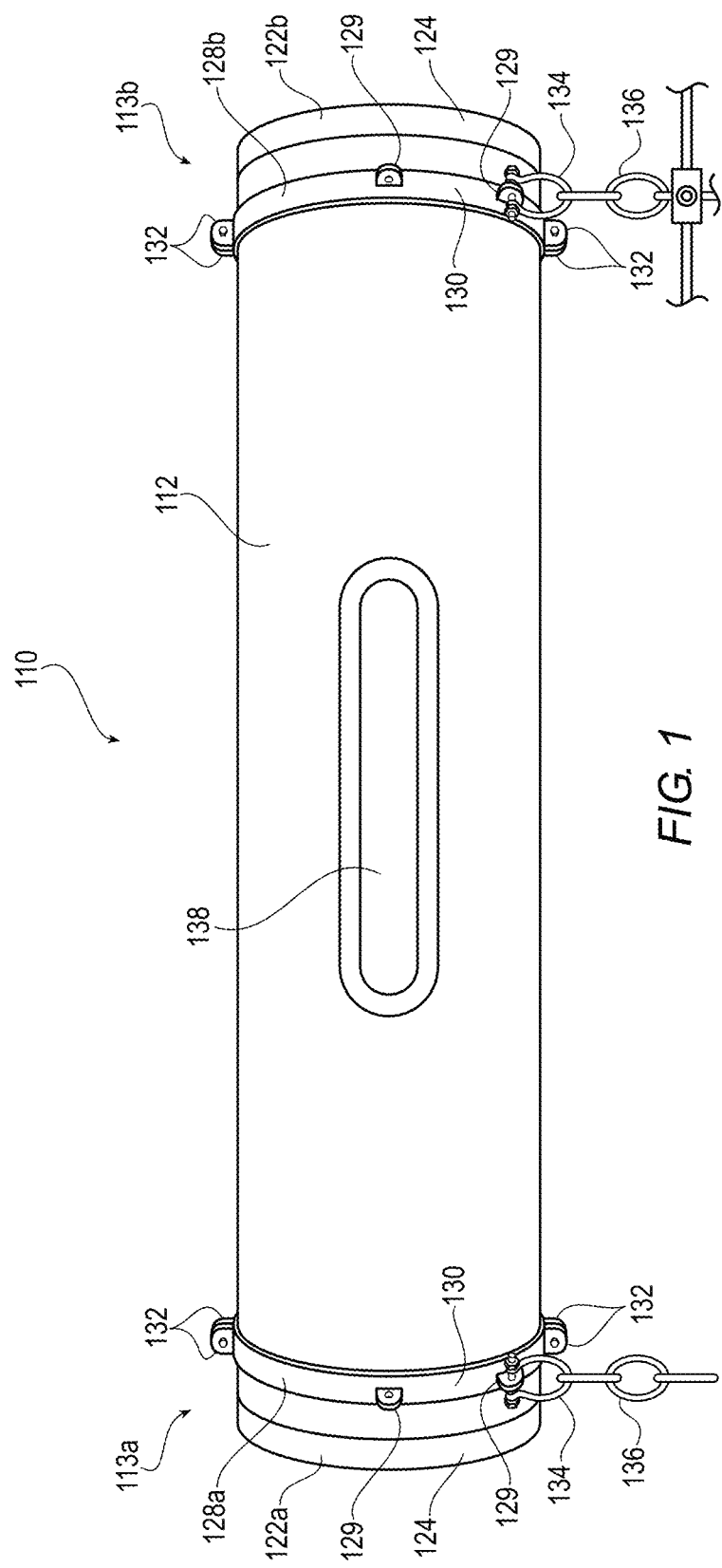
FIG. 1 is a front view of an HDPE marine boom with structure rings.
Figure 2:
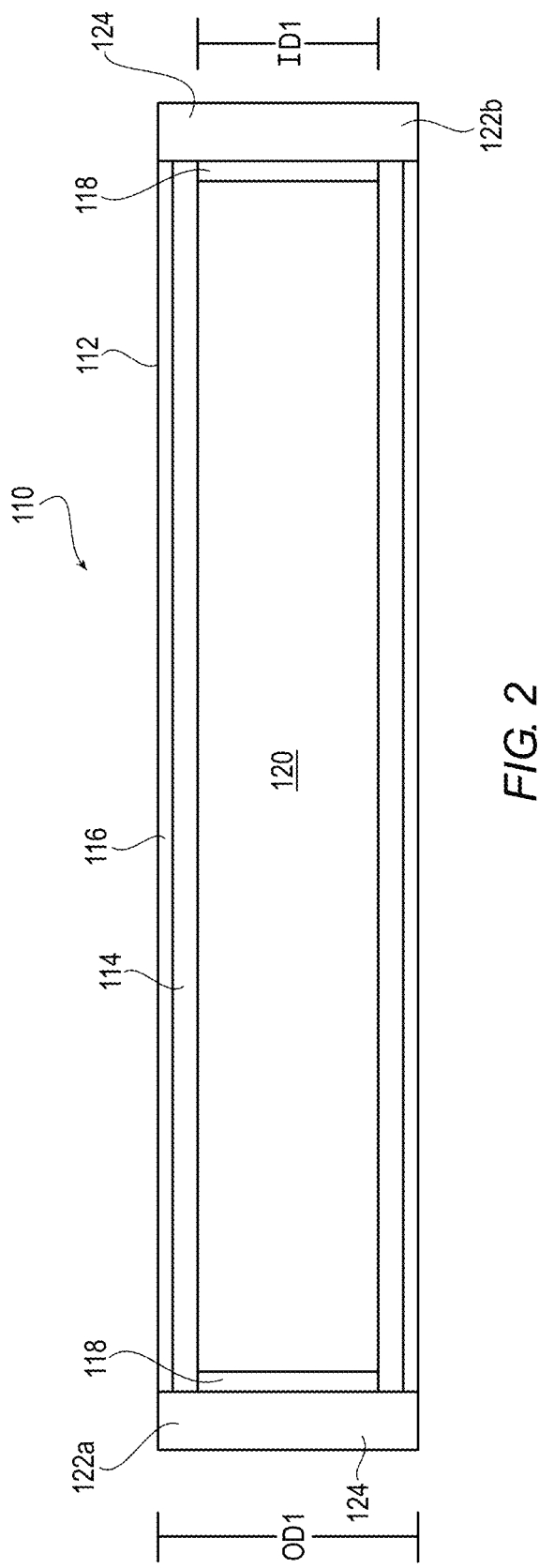
FIG. 2 is a is a longitudinal cross-sectional view of the shell, billet, and end caps of the boom of FIG. 1.
Figure 3:
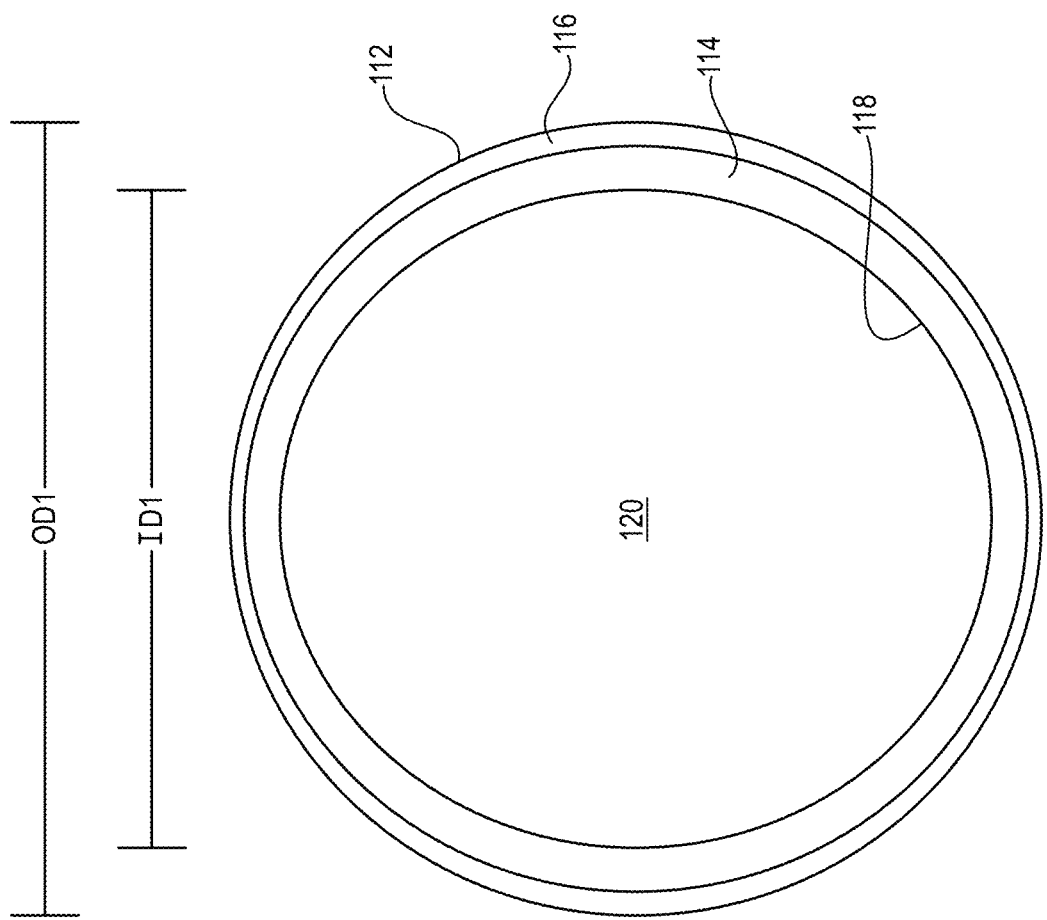
FIG. 3 is a is a lateral cross-sectional view of the shell, and billet of the marine boom of FIG. 1.

There is shown in FIG. 1 a High-Density Polyethylene (HDPE) marine boom 110. The marine boom 110 includes an elongated generally cylindrical shell 112 having first and second ends 113a and 113b. As best shown in FIGS. 2 and 3, the shell 112 has an outer diameter OD1 and an inner diameter ID1. The shell 112 includes an inner layer 114 and an outer layer 116. The inner layer 114 and outer layer 116 are formed from an HDPE with the same formulation, with the inner layer 114 further including at least 2% carbon black by mass and the outer layer 116 not including carbon black, and the outer layer 116 further includes a colorant with ultraviolet stabilizers and antioxidants and the inner layer 114 does not include the colorant. For example, the material for the inner and outer layers 114 and 116 may be ASTM (D3350) HDPE produced according to ASTM D 3350-14 PE 445444 C/E with C refereeing to a 2% minimum carbon black in the inner layer 114 and E referring to the addition of a colorant with UV stabilizer and antioxidants in the outer layer 116. The inner layer 114 and outer layer 116 have been coextruded to form a unitary body for the shell 112. In one preferred embodiment the thickness of the inner layer 114 to the outer layer 116 is in a ratio of approximately 7 to 1. For one example, the inner layer 114 may have a thickness of 28 mm while the outer layer has a thickness of 4 mm. However, it is generally always preferred that that the inner layer 114 is thicker than the outer layer 116. It is noted that the carbon free outer layer 116 is generally translucent, except for the added colorant, and that the inner layer 114 is generally black due to the addition of carbon black. Thus, one factor in the determination of the thickness of the outer layer 116 is the perception of the color desired, as a thinner outer layer 116 would appear darker than a relatively thicker outer layer 116.

The shell 112 defines cavity 118. A floatation billet 120 disposed within the cavity 118 of the shell 112. In various embodiments, the billet 120 is formed as monolithic body and disposed in the shell 112 as a unitary piece, formed in pieces and joined into a single piece disposed in the cavity 118 of the shell 112, formed as a monolithic body cut into pieces disposed in the cavity as discrete pieces, or formed as separate pieces disposed in the cavity as discrete pieces. The billet 120 is preferably made of a foam plastic, polymer, or resin, with a preferred example being expandable polystyrene.

It has been discovered that due to the effects of gravity, the shell 112 of the marine boom 110 generally rests slightly out of round. Further, it has been discovered that the shell 112 being formed from HDPE has a tendency to slightly shrink when in relatively colder environments. This particularly true for the shell 112, which has been coextruded with the outer layer 116 free of carbon black. Thus, in at least one embodiment, it is preferred that the diameter of the billet 120 is less than the inner diameter of the shell 112, particularly preferably at least ⅛th of an inch less.

Figure 5:
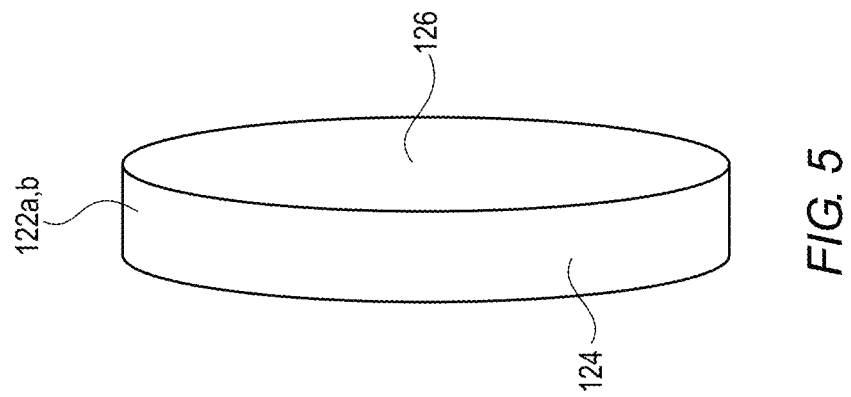
FIG. 5 is an outside end perspective schematic representation of one of the end caps of the marine boom of FIG. 1.
Figure 4:
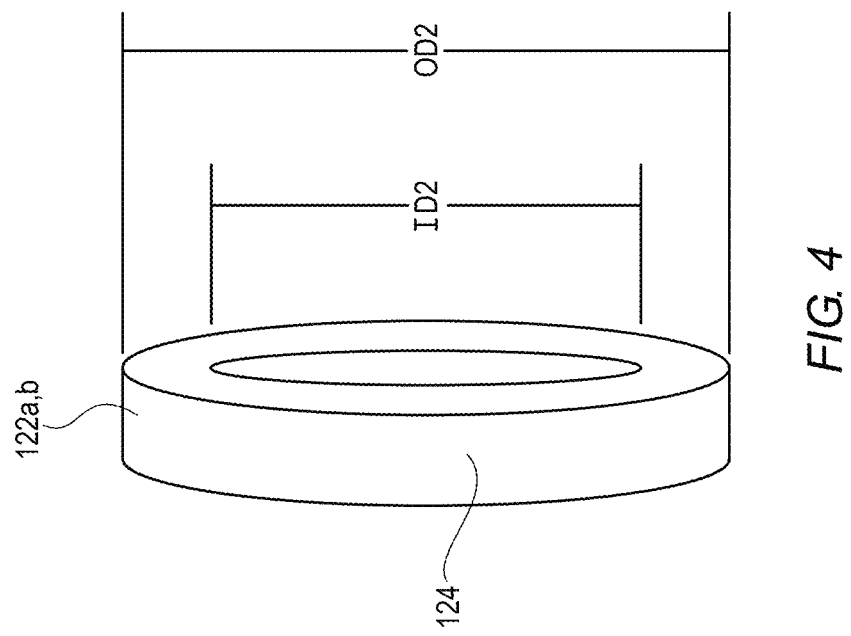
FIG. 4 is a is an inside end perspective schematic representation of one of the end caps of the marine boom of FIG. 1.

The marine boom 110 includes first and second end caps 122a and 122b, see also FIGS. 4 and 5. The first and second caps 122a and 122b are preferably formed from the same material as the outer layer 116. The first and second end caps 122a and 122b are disposed about the first and second ends 113a and 113b, respectively. Each cap 122a and 122b includes generally cylindrical main body 124 having an outer diameter OD2 and an inner diameter ID2 equal to the outer diameter OD1 and an inner diameter ID1 of the shell. An end wall 126 extends across one end of the main body 124. The other end of the main body 124 of each of the first and second caps 122a and 122b are axially aligned with the first and second ends 113a and 113b of the shell 112 respectively and are fusion welded together across the full thickness of the first and second ends 113a and 113b and around the full circumference of the first and second ends 113a and 113b forming a watertight seal. In a preferred embodiment the outer circumferential surface of the marine boom 110 at the weld joint of the shell 112 and caps 112a and 122b is a continuous and even surface with the remainder of the circumferential. For example, a weld bead formed after fusion weld may be removed by chiseling, shaving, or other mechanisms.

Figure 6:
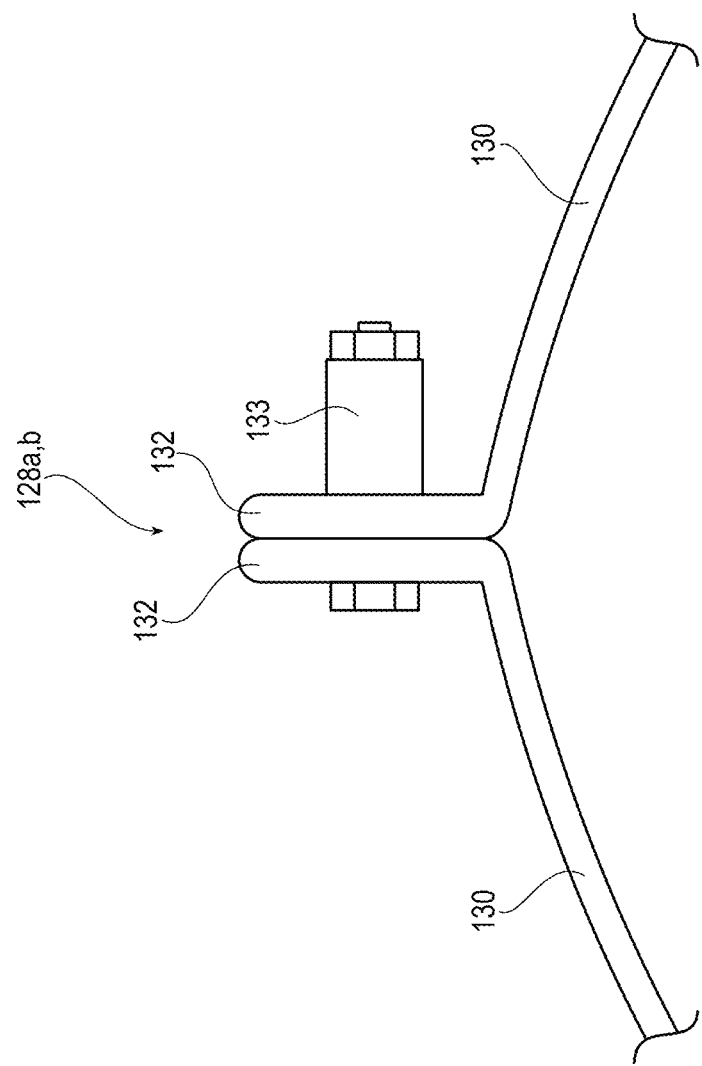
FIG. 6 is a partial side schematic representation of a connection of the two pieces of one of the structure rings of the marine boom of FIG. 1

The marine boom 110 further includes optional structure rings 128a and 128b disposed around the circumference of the shell 112 proximate the first and second ends 113a and 113b respectively, see also FIG. 6. Each ring 128a and 128b include two generally semi-circular arcuate pieces 130 of metal, preferably steel, for example a galvanized steel, extending circumferentially along the shell 112 and forming a collar about the shell 112. At least one lug 129 protrudes from each arcuate piece 130 in the radial direction of the shell 112. Each arcuate piece 130 terminates on each of its two ends with a coupling tab 132 extending generally radially away from the shell 112. The two arcuate pieces 130 are fastened together through apertures in the tabs 132 and thus the structure rings 128a and 128b are compressively mounted to the shell 112. The arcuate pieces 130 are preferably joined with threaded fasteners, for example a bolt-nut fastener or a stud-nuts fastener. Preferably, a spring member 133 is disposed outside of one of the tabs 132 and between the tab 132 and portion of the ring fasteners, such as a bolt head or nut/nut with washer(s) to accommodate expansion and contraction of the shell 112 due to temperature change or other factors. For example, the spring member may be a die spring, most preferably being a cylindrical body formed from an elastomeric material, such as HD Urethane, through which a shaft of the fastener passes. Alternatively, the spring may be a coil type spring, a hydraulic/pneumatic shock device, or any other suitable spring. The pieces 130 may include surface ribs on the inner surface of the pieces that engages with the outer surface of the shell 112 to increase retention power. For example, the marine boom 110 may then be secured by one or more shackle 134 coupling one or more lug 129 to one or more chains 136. Further, the chains 136 may be tethered to a helper cable 137, particularly in situations where larger than normal loads are expected or where there is a concern about rotation of the marine boom 110.

The marine boom 110 also includes an optional graphic 138 fusion welded to the outer layer 116. The graphic includes an image formed on a piece of polymer film which has been fused to the shell 112 by flame treating the polymer film and the outer layer 116 until each at least partially liquifies and then allowing the two to cure together.

Figure 7:
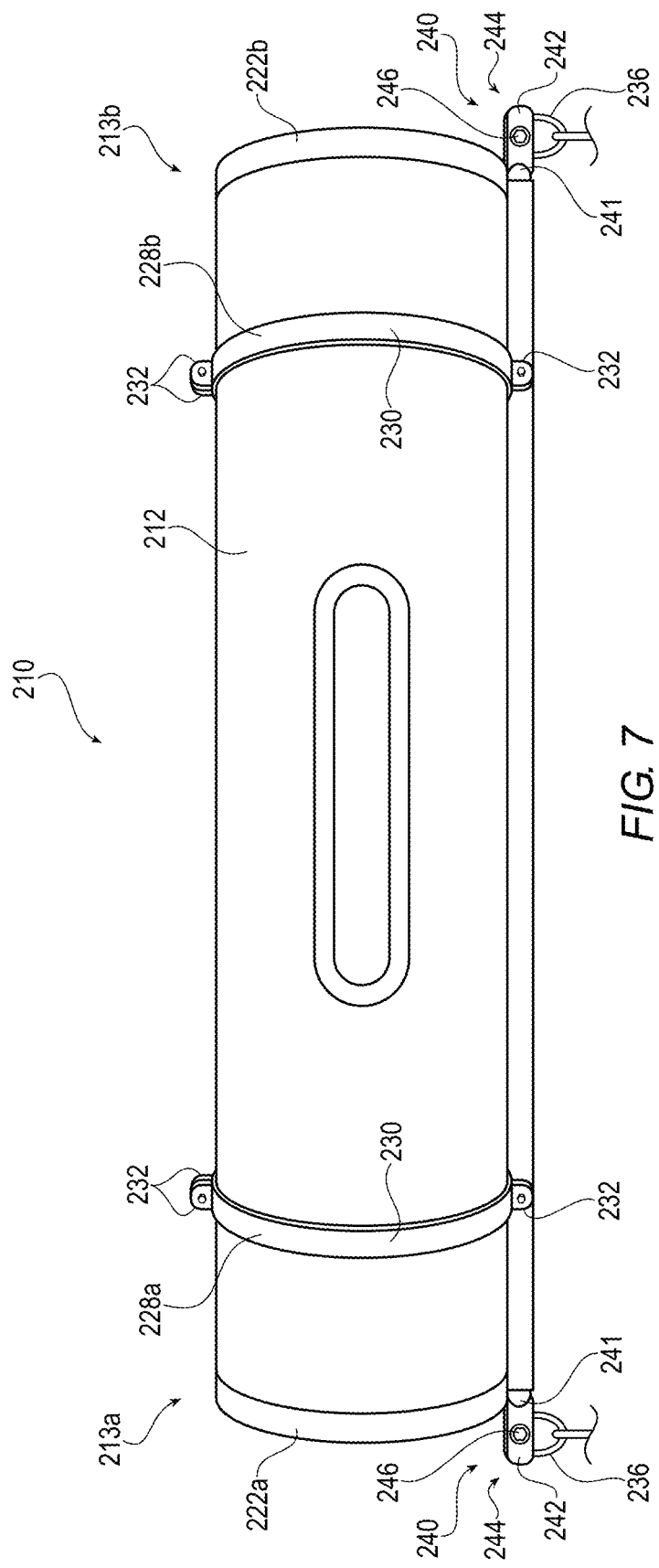
FIG. 7 is a front view of an HDPE marine boom with an exoskeleton according to another embodiment.
Figure 8:
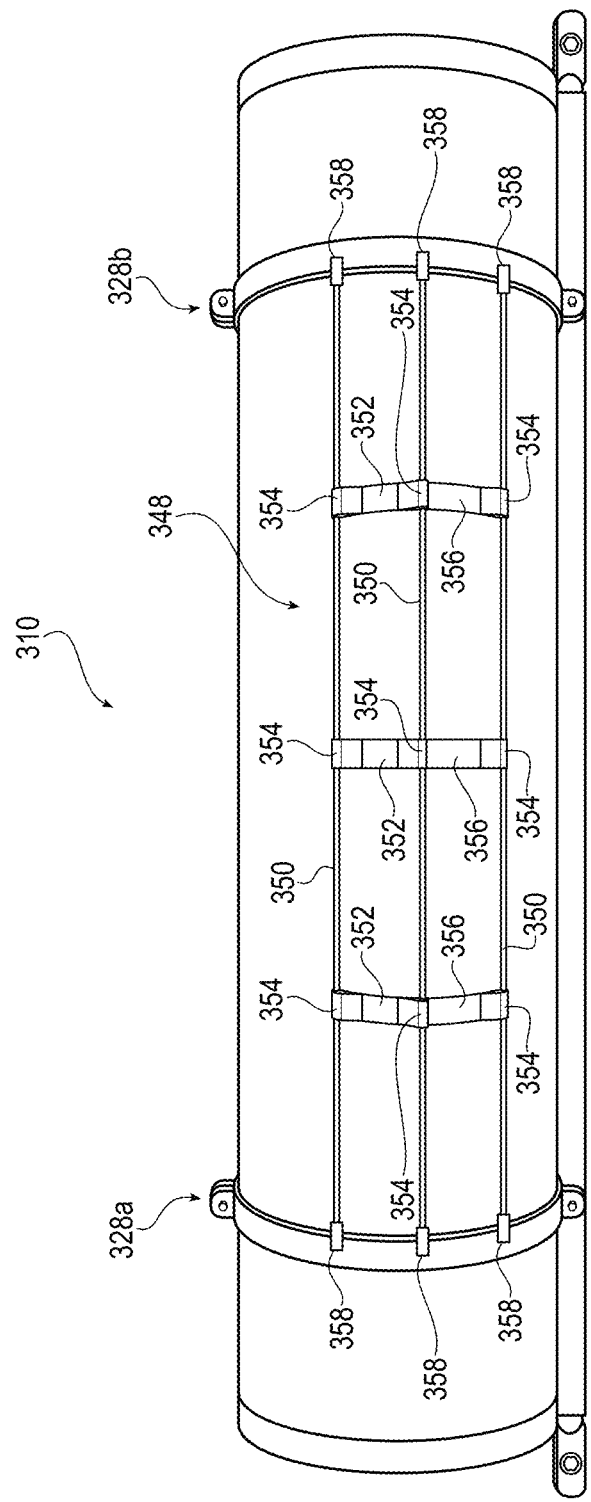
FIG. 8 is a front view of an HDPE marine boom with a strap system.
Figure 16:
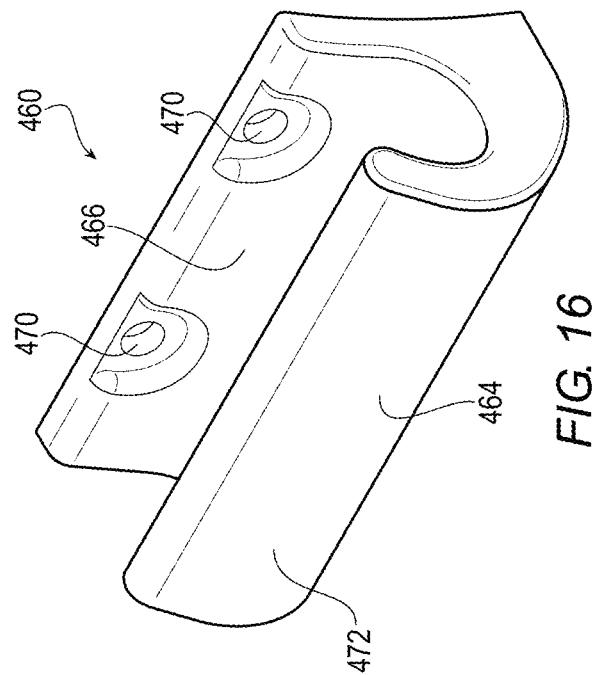
FIG. 16 is a top right perspective view of the hand hold of FIG. 15.
Figure 15:
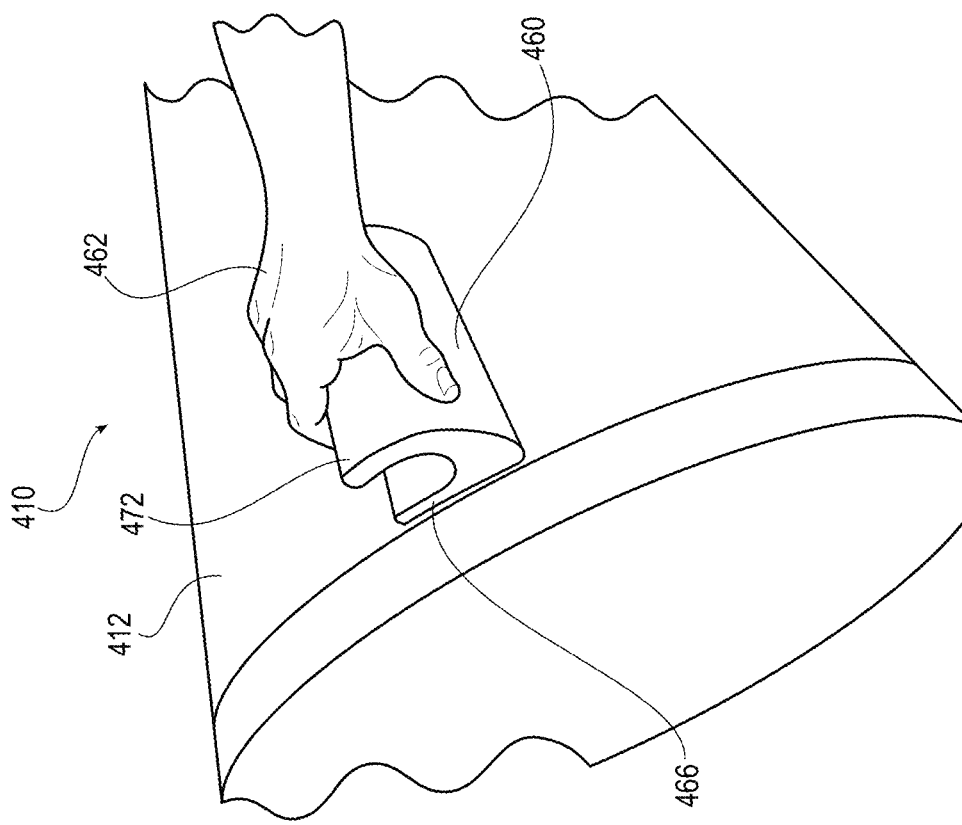
FIG. 15 is a partial top left perspective view of a marine boom with a hand hold.
Figure 18:
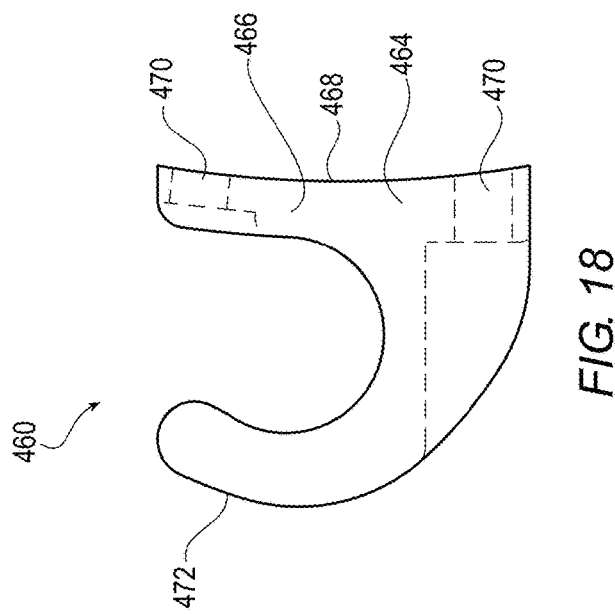
FIG. 18 is a side schematic view of the hand hold of FIG. 15.
Figure 17:
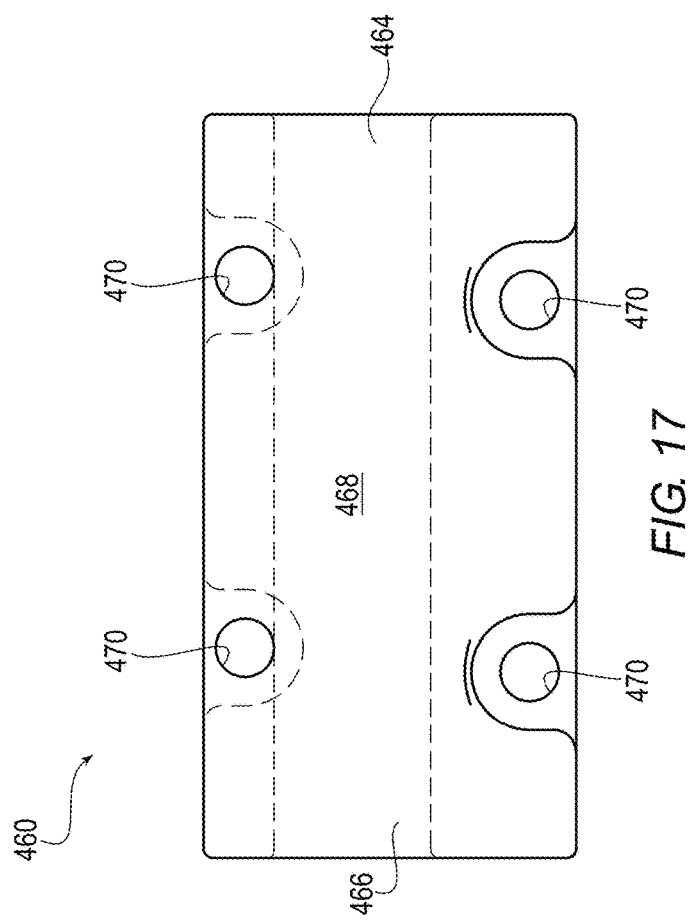
FIG. 17 is a back schematic view of the hand hold of FIG. 15.
Figure 20:
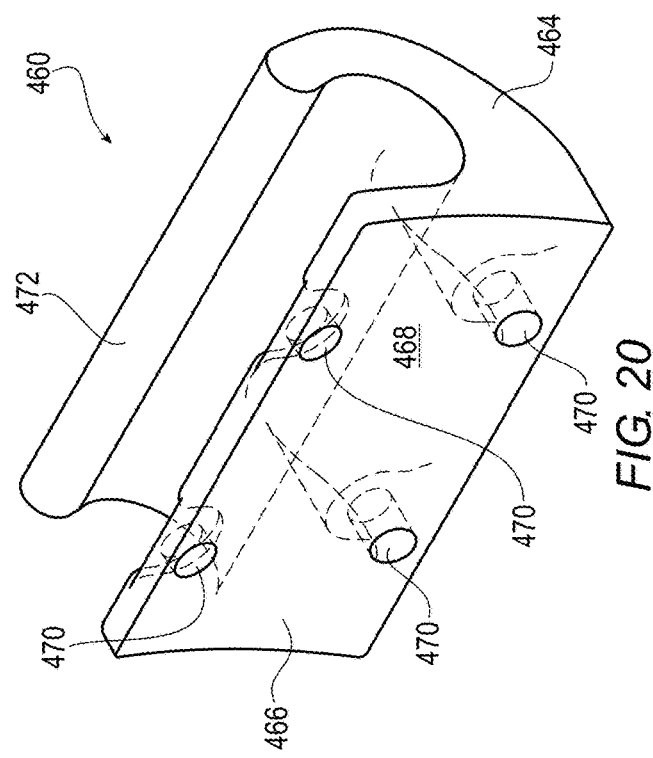
FIG. 20 is a back top perspective schematic view of the hand hold of FIG. 15.
Figure 19:
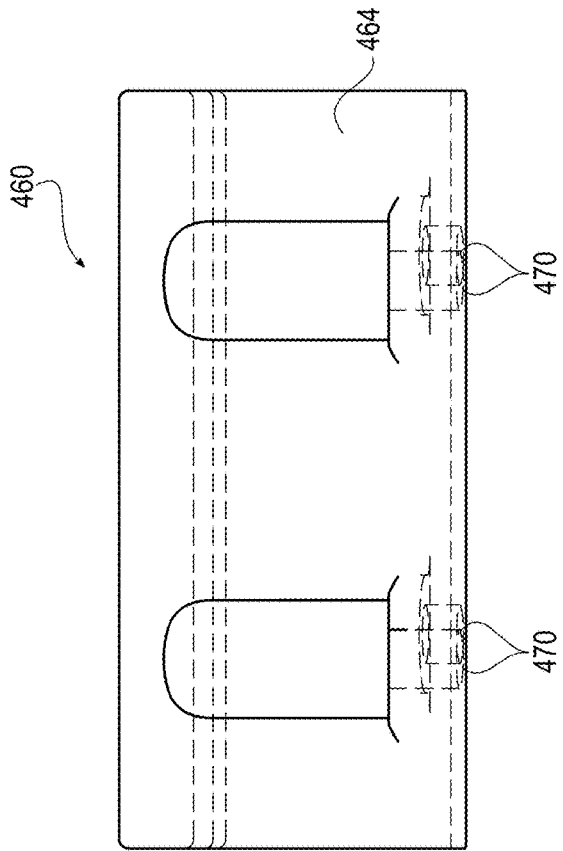
FIG. 19 is a bottom schematic view of the hand hold of FIG. 15.

Referring now to FIG. 7, there is shown another HDPE marine boom 210, similar to the marine boom 110 described above, numbered with similar identifiers for similar components, and described with the differences below. The marine boom 210 includes optional structure rings 228a and 228b disposed around the circumference of a shell 212 proximate first and second ends 213a and 213b, respectively. Each ring 228a and 228b includes two generally flat semi-circular arcuate pieces 230 of metal, preferably steel, extending circumferentially along the shell 212 to form a collar. Each arcuate piece 230 terminates on each of its two ends with a coupling tab 232 extending generally radially away from the shell 212. At the top of the shell 212 two arcuate pieces 230 are bolted together through apertures in the tabs 232, and may include a spring member as discussed above. At the bottom of the shell 212 the two arcuate pieces 230 are both bolted to a structural member 238. The structural member 238 is generally elongate member, preferably formed from steel. In one embodiment the structural member 238 is formed as a U channel mounted with the "U" opening up toward the shell 212. The pieces 230 are bolted to the structural member 238 by bolts passing through the apertures on the tabs 232 and corresponding apertures on the structural member 238 with a bolt head on one side and a nut on the other, a nut on each side, both ends welded or fixed in place, or any other suitable mounting of the pieces 230 to the structural member 238. Thus, the structure rings 228a and 228b are compressively mounted to the shell 212 for retention of the structural member 238 to the shell 212. The pieces 230 may include surface ribs on the inner surface of the pieces that engages with the outer surface of the shell 212 to increase retention power. The inclusion of the structural member 238 lowers the center of gravity of the marine boom 210 as compared to the assembly without the structural member 238, and carries longitudinal loading on the marine boom 210. It is preferred that the length of the structural member 238 is less than the length of between the end walls of two end caps 222a and 222b. It is also preferred that the structural member 238 is placed such that the ends of the structural member 238 do not extend past the end walls of two end caps 222a and 222b, and most preferred that the ends of the structural member 238 do not extend past the ends of the shell 212.

For further example, the marine boom 210 may include an optional connector 240 that is attached to one end of the structural member 238. In the illustrated example, the structural member is formed as an elongated U channel opening up toward the bottom of the shell 212. The connector 240 includes generally planar base plate 241 that is attached to the structural member, for example by fasteners such as bolts and nuts, by welding, or by any other suitable mounting, and includes at least one lug 242 attached to the base plate 241 and extending axially away from the marine boom 212 and beyond the end cap 222b. In the present example, the connector 240 includes two lugs 242 forming a yoke 244. A link of a chain 236 is disposed in the yoke 244 and secured with a bolt assembly 246. Another link in the chain 236 may then be connected to any item to which to secure marine boom 210, such as another marine boom for example In a further embodiment, with a series of marine booms 210 are connected together. The marine booms may be deployed in a debris containment environment as the relative lower center of gravity reduces the rolling tendency of the marine booms 210 and the inclusion of the structural member 238 provides tensile support to forces acting on the marine booms 210 from interaction with debris.

Optional marine devices may be included in such a series of marine boom 210, including but not limited to debris skirts suspended from one or more of the marine booms 210, debris panels mounted between the marine booms 210, boat passage gates deployed between marine booms 210, and/or fish exclusion netting secured to the marine booms 210.

Referring now to FIGS. 8-14, there is shown another HDPE marine boom 310, similar to the marine booms 110 and 210 described above, numbered with similar identifiers for similar components, and described with the differences below. The marine boom 310 includes a strap system 348. In one use, the strap system 348 is provided as a grasp for a person who may be in the water with the marine boom 310. The strap system 348 includes at least two tethers 350 (three are shown) mounted to the marine boom 310 and extending generally parallel along the longitude of a shell 312 of the marine boom 310. The tethers 350 are preferably vinal coated steel wire, although such is not required. At least one strap 352 is disposed along the tethers 350 and positioned generally perpendicular there to. Each strap 352 includes at least strap passageways 354 (three shown) each having at least one of the tethers 350 passing therethrough. The strap is formed with a generally planar main body 356 which conforms to the outer surface of the shell 312 when installed there on. The straps 350 are preferably made of a weather durable nylon, although such is not required. The strap system 348 includes connectors 358 to mount the strap system 248 to the marine boom 310. In the illustrated example the tethers 350 are mounted to structure rings 328a and 328b of the marine boom 310. In one example, the tethers 350 are fastened directly to the structure rings 328a and 328b. In a preferred example, a turnbuckle is included along the tethers 350 and/or between the tethers 350 and the structure rings 328a and 328b in order to adjust the tension on the tethers 350. For further example, mounting tabs may be fixed to the structure rings 328a and 328b and the tethers 350 then attached to the mounting tabs. Preferably such tabs extend longitudinally along the shell 312 parallel to the tethers 350. Alternatively, the tethers 350 may be mounted directly to the shell 312 by anchoring the tethers to the shell 312. This may include the direct use of fasteners, or insets may be placed in the shell 312 and then the tethers fastened to the shell 312 in cooperation with the insets. This may optionally include one or more turnbuckles to adjust the tension of the tethers 350.

Referring now to FIGS. 15-20, there is shown a portion of another HDPE marine boom 410, similar to the marine booms 110, 210, and 310 described above, numbered with similar identifiers for similar components, and described with the differences below. The marine boom 310 includes a hand hold 460. In one use, the hand hold 460 is provided as a grasp for a person 462 who may be in the water with the marine boom 410.

The hand hold 460 forms a hand hold block 464 including a main attachment body 466 having a rear surface 468 having a curvature coincident with an outer curvature of a shell 412 of the marine boom 410. A plurality of mounting apertures 470 are formed in the hand hold block 464 through the main attachment body 466. In the illustrated example, there are four apertures 470 with a first pair of two apertures 470 aligned horizontally toward the top of the main attachment body 466 and a second pair of two apertures aligned horizontally toward the bottom of the main attachment body, with the first and secondly pairs being longitudinally offset. The hand hold 460 is mounted directly to the shell 412 by anchoring the main attachment body 466 to the shell 412. This may include the direct use of fasteners through the apertures 470 cooperating with the shell 412, or insets may be placed in the shell 412 and then fasteners through the apertures 470 cooperate with the inserts, such as spin welded inserts fixed in holes routed into the shell 412. Thus, the hand hold block 464 is disposed about an outer circumferential surface of the shell 412 with the rear surface 468 facing the outer circumferential surface and coincident therewith. The hand hold 460 includes a grasp portion 472 formed in the hand hold block 464 and extending outwardly and upwardly from the attachment body 466.

While principles and modes of operation have been explained and illustrated with regard to particular embodiments, it must be understood, however, that this may be practiced otherwise than as specifically explained and illustrated without departing from its spirit or scope.

What is claimed is:

1. A High-Density Polyethylene (HDPE) marine boom comprises:
    an elongated generally cylindrical shell including an inner layer and an outer layer, where the inner layer and outer layer are formed from HDPE with the same formulation, with the inner layer further including at least 2% carbon black by mass and the outer layer does not include carbon black and the outer layer further including a colorant with ultraviolet stabilizers and the inner layer does not include the colorant, the inner layer being thicker than the outer layer, where the inner layer and outer layer have been coextruded to form a unitary body, the shell defining a cavity, the shell having first and second ends;
    first and second end caps formed from the same material as the outer layer disposed about the first and second ends respectively, each cap including a generally cylindrical main body having an outer diameter and an inner diameter equal to an outer diameter and an inner diameter of the shell, and an end wall extending across one end of the main body, where the other end of the main body of each of the first and second caps are axially aligned with the first and second ends of shell respectively and are fusion welded together across the full thickness and around a full circumference of the first ends and the second ends and forming a watertight seal; and
    a floatation billet disposed within the cavity in the shell.

2. The HDPE marine boom of claim 1 further comprising at least first and second structure rings each disposed about a respective circumference of the shell proximate the first and second ends of the shell respectively, each ring including two generally semicircular arcuate pieces, extending circumferentially along the shell and forming a collar about the shell, each piece terminating at each end with a coupling tab, where the pieces of each ring are fastened together at at least one end with a fastener extending through apertures in the tabs and a spring member disposed outside one of the coupling tabs and disposed therebetween the one of the one of the coupling tabs and a portion the fastener.

3. The HDPE marine boom of claim 2 where the pieces of each ring are fastened together at the other end with another fastener extending through apertures of those tabs, and where at least one lug extends from at least one of the arcuate pieces.

4. The HDPE marine boom of claim 3 where a chain is shackled to the lug.

5. The HDPE marine boom of claim 2 where the pieces of each ring are fastened at the other end to a structural member with another fastener extending through apertures of those tabs and through the structural member, and where the structural member is a generally elongate U channel facing upward toward the shell, and having ends that do not extend beyond the end walls of the first and second end caps.

6. The HDPE marine boom of claim 5 further comprising first and second connectors, each disposed in a respective end of the structural member and attached there to, each connector having at least one lug extending axially away from the HDPE marine boom and beyond its respective end cap.

7. The HDPE marine boom of claim 5 further comprising one of a debris skirt, a debris panel, a marine light, a gate, and a net connected to the structural member.

8. The HDPE marine boom of claim 1 where the thickness of the inner layer to outer layer is in a ratio of approximately 7 to 1.

9. The HDPE marine boom of claim 1 further comprising a graphic formed on a piece of polymer film and fuses to the shell by flame treating the polymer film and the outer layer of the shell until each at least partially liquifies and then allowing the two to cure together.

10. The HDPE marine boom of claim 1 further comprising a hand hold block including a main attachment body having a rear surface having a curvature coincident with an outer curvature of the shell and including a plurality of mounting apertures and including a grasp portion extending outwardly and upwardly from the attachment body, the hand hold block disposed about an outer circumferential surface of the shell with the rear surface facing the outer circumferential surface, and including a plurality of mounting fasters each extending through a perspective mounting aperture an into the outer layer of the shell or inserts in the shell.

11. The HDPE marine boom of claim 1 further comprising a strap system including at least two tethers mounted to the HDPE marine boom and extending generally parallel along the longitude of the shell, and at least one strap including at least two strap passageways each having at least one of the tethers passing therethrough.

12. The HDPE marine boom of claim 11 where the tethers are vinal coated steel wire and the straps are made of weather durable nylon.

13. The HDPE marine boom of claim 11 where tethers are mounted to the shell.

14. The HDPE marine boom of claim 2 further comprising a strap system including at least two tethers mounted to the HDPE marine boom and extending generally parallel along the longitude of the shell, and at least one strap including at least two strap passageways each having at least one of the tethers passing therethrough, where the tethers are mounted between the first and second structure rings.

15. A marine boom system comprising:
    a plurality of High-Density Polyethylene (HDPE) marine booms, each having:
        an elongated generally cylindrical shell including an inner layer and an outer layer, where the inner layer and outer layer are formed from HDPE with the same formulation, with the inner layer further including at least 2% carbon black by mass and the outer layer does not include carbon black and the outer layer further including a colorant with ultraviolet stabilizers and the inner layer does not include the colorant, the inner layer being thicker than the outer layer, where the inner layer and outer layer have been coextruded to form a unitary body, the shell defining a cavity, the shell having first and second ends;

first and second caps formed from the same material as the outer layer disposed about the first and second ends respectively, each cap including a generally cylindrical main body having an outer diameter and an inner diameter equal to an outer diameter and an inner diameter of the shell, and an end wall extending across one end of the main body, where the other end of the main body of each of the first and second caps are axially aligned with the first and second ends of shell respectively and are fusion welded together across the full thickness and around a full circumference of the first ends and the second ends and forming a watertight seal;

a floatation billet disposed within the cavity in the shell;

at least first and second structure rings each disposed about a respective circumference of the shell proximate the first and second ends of the shell respectively, each ring including two generally semicircular arcuate pieces, extending circumferentially along the shell and forming a collar about the shell, each piece terminating at each end with a coupling tab, where the pieces of each ring are fastened together at at least one end with a fastener extending through apertures in the tabs and a spring member disposed outside one of the coupling tabs and disposed therebetween the one of the one of the coupling tabs and a portion the fastener;

a structure member, where the pieces of each ring are fastened at the other end to the structural member with another fastener extending through apertures of those tabs and through the structural member, and where the structural member is a generally elongate U channel facing upward toward the shell, and having ends that do not extend beyond the end walls of the first and second end caps;

first and second connectors, each disposed in a respective end of the structural member and attached there to, each connector having at least one lug extending axially away from the HDPE marine boom and beyond its respective end cap;

where the plurality of marine booms are connected together by the first and second connectors of each marine boom.

16. The marine boom system of claim 15 where at least one of a debris skirt, a debris panel, a marine light, a gate, and a net is connected to the structural member of at least one HDPE marine boom.

17. The marine boom system of claim 15 where the thickness of the inner layer to outer layer is in a ratio of approximately 7 to 1.

18. The marine boom system of claim 1 where a graphic formed on a piece of polymer film and fuses to the shell of at least one HDPE marine boom of the plurality by flame treating the polymer film and the outer layer of the shell of the one HDPE marine boom until each at least partially liquifies and then allowing the two to cure together.

19. The marine boom system of claim 15 where at least one HDPE marine boom of the plurality of marine booms includes a hand hold block including a main attachment body having a rear surface having a curvature coincident with an outer curvature of the shell and including a plurality of mounting apertures and including a grasp portion extending outwardly and upwardly from the attachment body, the hand hold block disposed about an outer circumferential surface of the shell with the rear surface facing the outer circumferential surface, and including a plurality of mounting fasters each extending through a perspective mounting aperture an into the outer layer of the shell or inserts in the shell.

20. The marine boom system of claim 15 where at least one HDPE marine boom of the plurality of marine booms includes a strap system including at least two tethers mounted to the one HDPE marine boom and extending generally parallel along the longitude of the shell, and at least one strap including at least two strap passageways each having at least one of the tethers passing therethrough.

21. The marine boom system of claim 20, where the tethers are mounted between the first and second structure rings.

* * * * *